United States Patent
Pellar (10) Patent No.: US 7,679,783 B2
(45) Date of Patent: Mar. 16, 2010

(54) SYSTEM AND METHOD FOR EXTRACTING GRAYSCALE DATA WITHIN A PRESCRIBED TOLERANCE

(75) Inventor: Ronald J. Pellar, Orange, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 769 days.

(21) Appl. No.: 11/371,830

(22) Filed: Mar. 9, 2006

(65) Prior Publication Data

US 2007/0211267 A1    Sep. 13, 2007

(51) Int. Cl.
G06F 15/00 (2006.01)
G06K 1/00 (2006.01)
H04N 1/60 (2006.01)

(52) U.S. Cl. ............ 358/1.9; 358/3.01; 358/2.1; 358/3.27; 358/504; 358/518; 382/199; 382/266; 382/254; 382/162; 382/167

(58) Field of Classification Search .............. 358/1.6, 358/1.9, 2.1, 3.01–3.32, 532–406; 382/199, 382/266, 254, 162, 167
See application file for complete search history.

(56) References Cited

U.S. PATENT DOCUMENTS

| | | | | |
|---|---|---|---|---|
| 5,134,667 A | * | 7/1992 | Suzuki | 382/164 |
| 5,333,243 A | * | 7/1994 | Best et al. | 358/1.9 |
| 5,805,738 A | * | 9/1998 | Kaburagi et al. | 382/251 |
| 6,081,254 A | * | 6/2000 | Tanaka et al. | 382/167 |
| 6,731,400 B1 | * | 5/2004 | Nakamura et al. | 358/1.9 |
| 6,930,690 B1 | | 8/2005 | Kulkarni | |
| 6,930,790 B1 | * | 8/2005 | Forthoffer | 358/1.15 |
| 7,207,645 B2 | * | 4/2007 | Busch et al. | 347/19 |
| 2003/0035149 A1 | * | 2/2003 | Ishikawa et al. | 358/302 |
| 2004/0012817 A1 | * | 1/2004 | Brewington et al. | 358/3.06 |
| 2004/0075754 A1 | * | 4/2004 | Nakajima et al. | 348/231.6 |
| 2004/0126012 A1 | | 7/2004 | Sakaida | |
| 2004/0234135 A1 | * | 11/2004 | Nomizu | 382/209 |
| 2005/0063603 A1 | * | 3/2005 | Wang et al. | 382/254 |
| 2005/0264836 A1 | * | 12/2005 | Gotoh et al. | 358/1.9 |
| 2007/0263249 A1 | * | 11/2007 | Rich et al. | 358/1.15 |

* cited by examiner

Primary Examiner—Benny Q Tieu
Assistant Examiner—Quyen Ngo
(74) Attorney, Agent, or Firm—Tucker Ellis & West LLP (57) ABSTRACT

In accordance with the present invention, a system and method are described for producing pure gray tones on a multi-color document output device that includes a system for operating on device independent color data having at least three color components, which color data corresponds to one or more associated electronic documents. The system and method function to extract grayscale data from such a device independent color data description, which grayscale corresponds to a rendering and a single color space. Such resultant data, inclusive of a color data portion and a grayscale portion, is thus completed in device independent form.

15 Claims, 4 Drawing Sheets

SYSTEM AND METHOD FOR EXTRACTING GRAYSCALE DATA WITHIN A PRESCRIBED TOLERANCE

BACKGROUND OF THE INVENTION

The application pertains generally to the art of color image rendering, and more particularly to image rendering which extracts true grayscale values from a color image represented in a multi-dimensional color coordinate scheme. It will be appreciated that the subject application is particularly advantageous in generating renderings of electronic documents, and will be described with particular reference thereto. However, it will be appreciated that the subject system is applicable to any image rendering operation which would benefit by extraction of color information for generation of multi-bit halftone images that correspond to both a pallet of an image file and to rendering capabilities of a document processing device.

Earlier color image rendering systems frequently employ images that are described numerically relative to primary color components. Such color components are suitably additive in nature, such as red-green-blue (RGB), or subtractive, such as cyan, yellow, magenta (CYM), the latter of which is frequently coupled with a black color (K), referred to as CYMK or CYM(K). Many images rendered from such color descriptions include image portions which are gray. Gray objects that are rendered with multiple colors will typically lose edge definition and might have mis-registration artifacts, such as rainbowing. It is recognized that extraction of such gray information for rendering with a single color, such as black, can improve image quality and increase integrity of aspects such as edge generation. Furthermore, it is frequently less expensive and more expeditious to use a single, black color generator to render a gray, rather than multiple blends of color which require additional processing and added ink or toner use. While the preferred embodiment herein corresponds to gray extraction and rendering, it will be appreciated that the concepts disclosed herein are applicable to extraction and rendering of any image component that corresponds to a rendering capability of an associated document processing device.

There are three basic ways that a gray is typically produced on a printer, such as using all four colors on a four color printer, by way of example. A first method employs a composite coloration scheme employing a balance of primaries, such as cyan, magenta and yellow colorants. A second method employs multi-color composites. By way of example, this is suitably comprised of cyan, magenta, yellow and black. A third option is to form a gray coloration solely by use of a single color, typically black. While a four color gray generation approach may provide darker, richer gray values, this is often at a cost of sharpness in edges and lines due to overlaying of the four colors. In a typical system that employs the alternative, black color gray generation, a better edge definition is realized in edges and lines, but at a sacrifice of a production of as dark or rich a gray value. A particular choice as to which technique to use to render grays is frequently dependent on a selected object that is to be rendered, such as text, image, graphic stroke, graphic fill, and the like. Further, practical considerations, such as cost and speed, may govern which method is to be employed for generation of a gray level output.

The concepts disclosed herein are better appreciated with an understanding of numeric models used to represent images, and image colorization, in image processing or rendering applications. CIE L*a*b* (CIELAB or Lab) is frequently thought of one of the most complete color models. It is used conventionally to describe all the colors visible to the human eye. It was developed for this specific purpose by the International Commission on Illumination (Commission Internationale d'Eclairage, resulting in the acronym CIE). The three parameters (L, a, b) in the model represent the luminance of the color (L, L=0 yields black and L=100 indicates white), its position between red and green (a, negative values indicate green, while positive values indicate red) and its position between yellow and blue (b, negative values indicate blue and positive values indicate yellow).

The Lab color model has been created to serve as a device independent reference model. It is therefore important to realize that visual representations of the full gamut of colors in this model are not perfectly accurate, but are used to conceptualize a color space. Since the Lab model is three dimensional, it is represented properly in a three dimensional space. A useful feature of the model is that the first parameter is extremely intuitive: changing its value is like changing the brightness setting in a TV set. Therefore only a few representations of some horizontal "slices" in the model are enough to conceptually visualize the whole gamut, wherein the luminance is suitably represented on a vertical axis.

The Lab model is inherently parameterized correctly. Accordingly, no specific color spaces based on this model are required. CIE 1976 L*a*b* mode is based directly on the CIE 1931 XYZ color space, which sought to define perceptibility of color differences. Circular representations in Lab space corresponded to ellipses in XYZ space. Non-linear relations for L*, a*, and b* are related to a cube root, and are intended to mimic the logarithmic response of the eye. Coloring information is referred to the color of the white point of the system.

One of the first mathematically defined color spaces was the CIE XYZ color space (also known as CIE 1931 color space), created by CIE in 1931. A human eye has receptors for short (S), middle (M), and long (L) wavelengths, also known as blue, green, and red receptors. One need only generate three parameters to describe a color sensation. A specific method for associating three numbers (or tristimulus values) with each color is called a color space, of which the CIE XYZ color space is one of many such spaces. The CIE XYZ color space is based on direct measurements of the human eye, and serves as the basis from which many other color spaces are defined.

In the CIE XYZ color space, tristimulus values are not the S, M and L stimuli of the human eye, but rather a set of tristimulus values called X, Y, and Z, which are also roughly red, green and blue, respectively. Two light sources may be made up of different mixtures of various colors, and yet have the same color (metamerism). If two light sources have the same apparent color, then they will have the same tristimulus values irrespective of what mixture of light was used to produce them.

It would be advantageous to have a system that works on a defined color space, such as the XYZ color space, and extracts grayscale information for rendering on a single color, such as black, referred to herein as a "true gray" rendering.

SUMMARY OF THE INVENTION

In accordance with the present invention, a system and method are described for producing pure gray tones on a multi-color document output device that includes a system for operating on device independent color data having at least three color components, which color data corresponds to one or more associated electronic documents. The system and method function to extract grayscale data from such a device independent color data description, which grayscale corresponds to a rendering and a single color space. Such resultant data, inclusive of a color data portion and a grayscale portion, is thus completed in device independent form.

In accordance with a more limited aspect of the present invention, there is taught a system for producing gray tones which includes conversion of modified device independent data to that associated with the specified color space corresponding to at least one document processing device.

In accordance with a further limited aspect of the present invention, the system includes a gray balance converter which functions to calibrate gray balance prior to communication to a document processing device.

An advantage of the present invention is the provision of a system by which true gray image aspects may be extracted from an image described in multi-dimension color space.

Another advantage of the present invention is the teaching of a system which accomplishes extraction of true gray color aspects in device independent space.

Yet another advantage is the provision of a image rendering system which provides extraction of true gray color aspects with improved image characteristics.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain figures, including.

DETAILED DESCRIPTION OF THE PREFERRED EMBODIMENT

Figure 1:
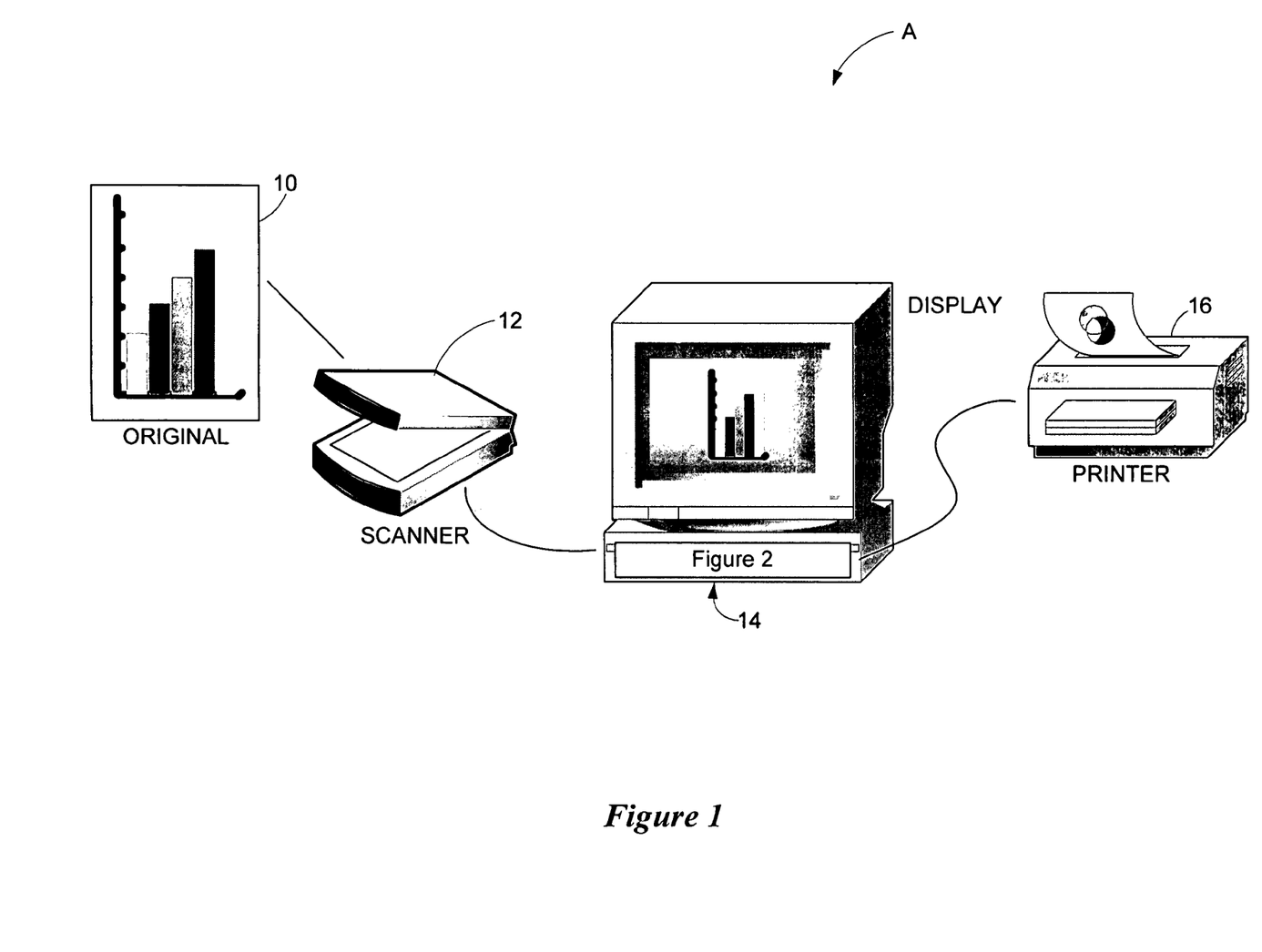
FIG. 1 which is an overall system diagram of a gray extraction and rendering system in connection with the subject invention.

Turning now to the drawings wherein the showings are for purposes illustrated in the preferred embodiment only, and not for the purpose of limiting the same. FIG. 1 illustrates an overall system diagram for the gray scale extraction as contemplated herein.

In FIG. 1, color rendering system A illustrates an original color rendering 10 which is suitably input into a scanning device 12 to form a digital description thereof. A digitized image is communicated to a suitable digital processor, such as illustrated as a computer system 14 that includes gray scale extraction as will be described below. Image data from which gray scale information has been extracted and suitably communicated to an output device, such as printer 16. Although the illustration is made in connection with an input as a scanning device and an output as printer, it is to be appreciated that a suitable digital image will be realized from any suitable input device, such as a digital camera, applications such as a drawing package, or receipt via input from an e-mail or storage device. Conversely, a suitable output can be a plotter, storage, transmission, and the like as will be appreciated by one of ordinary skill in the art.

Figure 2:
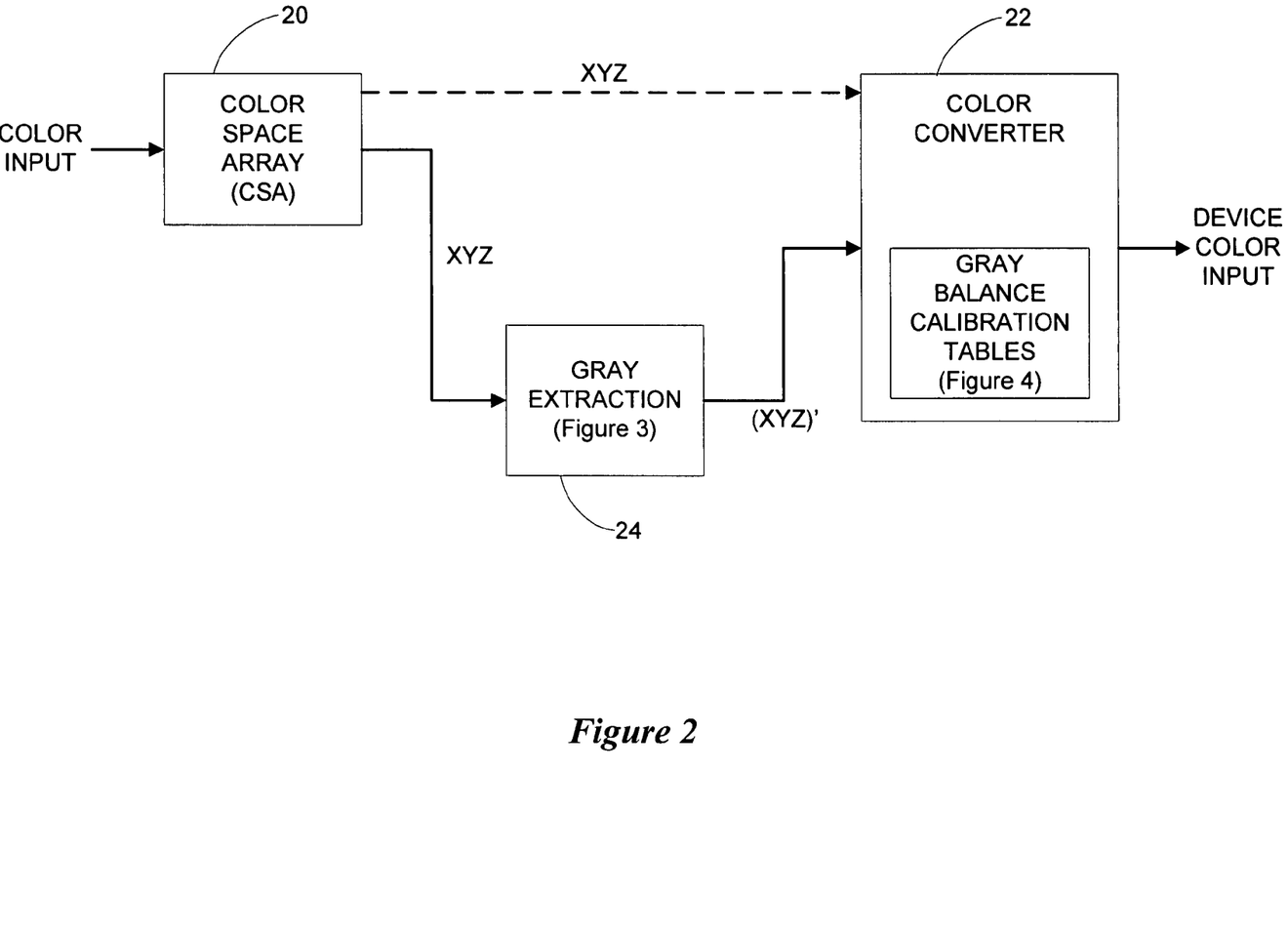
FIG. 2 is a flow diagram relative to gray extraction employed in the subject invention.

Turning now to FIG. 2, illustrated is a block diagram showing conversion suitably completed at the computer system 14 of FIG. 1. In FIG. 2, color input, such as that illustrated by the scanning device 12 of FIG. 1, is communicated to a color space array 20. In a typical conversion, a color-rendering path, such as used in an image path of the PostScript specification, data from the color space array is communicated directly to a color converter 22. In the example of a PostScript conversion, a color conversion in color converter 22 is typically accomplished with a color rendering dictionary.

The subject system accomplishes extraction of gray scale values from numeric color representation information. As will be appreciated from the description below, this separation is suitably accomplished at the color input level, at an intermediate level between the color space array and the color converter, or at the device color output level. For the reasons detailed below, it is particularly advantageous to extract grayscale information at the intermediate level, and via gray extraction system 24, as illustrated in FIG. 2.

Document imaging devices which are able to generate tonal values corresponding to more than one level are advantageously used such that a threshold value of an array is used completely between available output levels. In the subject system, a lower output of two possible values is chosen in the event an image input value is less than a selected threshold value. If an image value is greater than or equal to the threshold, a value which is higher of two output values is advantageously generated.

In determining a gray for particular color components, a determination is suitably made depending upon the location in a color conversion pipeline that a test determination is to be made. In an arbitrary three color system, components of which are suitably referred to as $C_1$, $C_2$ and $C_3$. A gray level is assumed to exist at a point where all components are assumed to be equal. However in this instance, a resultant gradation of gray level utilizing variations between the color components does not always hold true. This is particularly true for colors based on the CIE system described above. The subject invention is made in connection with the CIE color space. However, it is to be appreciated that any suitable color space, such as the International Color Consortium (ICC) space, Windows Color System (WCS) space, and the like, which is operable in a device independent profile connection space is suitable.

In a CIE color specification, the color space is typically converted by means of a color space array 20 into intermediate values, such as X, Y and Z values, such as illustrated in FIG. 2. Once so converted, it is then converted to a device specific output format such as red, green, blue (RGB); cyan, yellow and magenta, (CYM) or CYM with a black component, CYMK. This output, in turn, forms device color input to a rendering device as illustrated in FIG. 1. As noted above, it is to be appreciated that a determination of a suitable gray value is suitably performed at an input stage, prior to color space array 20, at an intermediate or XYZ stage as illustrated in FIG. 2 at gray extraction 24, or an output stage which is converted to a device dependent format after output of the color converter 22.

Considering the conversion option taken at the input stage, colors are suitably specified in a CIE based color space with a RGB type. Such gray levels are generally given by a condition wherein R=G=B, provided that input values have not been generated by a high precision calculation. In the event that image input is from a scanning device, or generated by a relatively low precision calculation, a definition of a gray color is not so easily defined. In some cases, a CIE color specification is made in a luminance-chrominance such as YCC (luminance Y, red chrominance $C_r$, blue chrominance, $C_b$), CIE L*u*v* (designed for emissive colors and to be perceptually uniform), CIE L*a*b, noted above, and the like. Therein, a gray criteria will resemble a format such as $C_2=C_3=0$ in order to define a gray having a value determined by the $C_1$ component. Other than in situations wherein an input CIE color space is predetermined or is limited to known spaces, a gray determination at an input color value is generally not practical for a general case.

In accordance with the foregoing, the subject invention teaches a conversion and extraction of a true gray value at an intermediate XYZ stage as illustrated in the preferred embodiment of FIG. 2. In a typical application, an intermediate stage is formed between a color space array and color rendering dictionary, as used as a color converter by an Adobe Systems PostScript rendering mechanism as will be appreciated by one of ordinary skill in the art. As noted above, it is to be appreciated that such conversions are suitably employed, such as International Color Consortium (ICC) conversion, Microsoft Windows Coloring System (WCS), or any system employing a color system path wherein an operation is suitably accomplished in a profile connection space (PCS).

Typically, a larger tolerance value is required insofar as an output of a multi-dimensional look-up table will not have precision to determine gray colors with sufficient accuracy. In the event that the color converter 22 incorporates a color-rendering dictionary that been constructed to include linearization and gray balance, that is, constructed from direct measurement data with linear transfer functions, then gray determination is not typically feasible at a color rendering dictionary output. This is attributed to the fact that equal amounts of toner or ink will not produce neutral gray and proportions of toner required to yield a gray are difficult to ascertain in advance for any particular printer.

A suitable color converter incorporates a color rendering dictionary to facilitate conversion from an XYZ space to a color palette associated with an associated output device. As noted above, the subject invention teaches gray extraction at this intermediate level, and is therefore accomplished between the color space array 20 and color converter 22. This extraction is completed at gray extraction mechanism 24, which receives multi-dimensional color information, such as XYZ. A modified multi-dimensional description, with gray scale information extracted therefrom, is defined as (XYZ). This modified value is communicated to a color converter 22 for conversion to a format associated with a selective output device.

Figure 3:
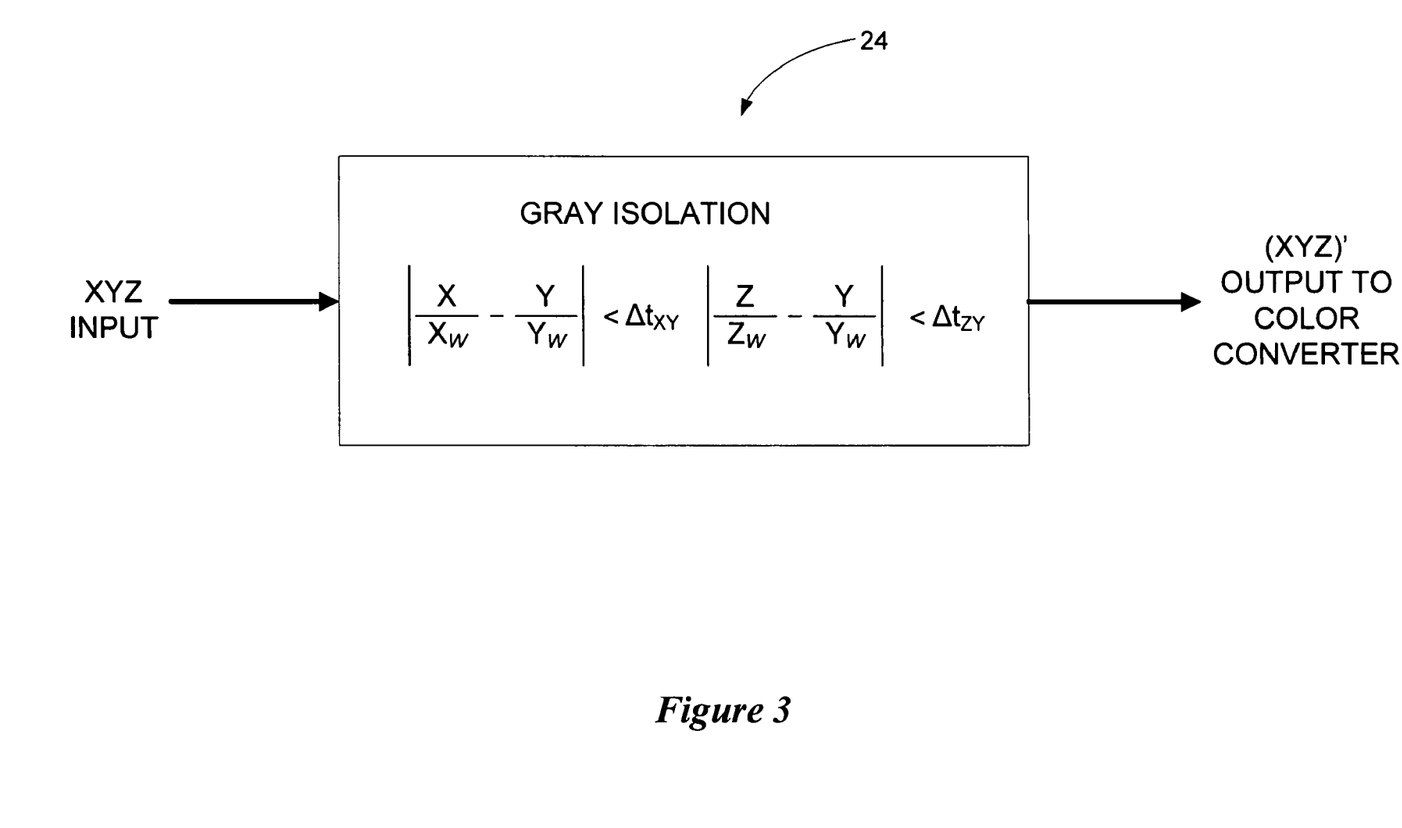
FIG. 3 is a flow diagram of a suitable gray isolation employed by the subject invention.

Turning to FIG. 3, a description of the gray extraction mechanism 24 is provided in greater detail. Gray isolation, as noted above, is completed at an intermediate stage between a color space array and a color converter, such as a color rendering dictionary in connection with a postscript embodiment. A color value in the CIE XYZ color space is referred to as a source illuminant.

In a PostScript embodiment, calculation of gray values is suitably accomplished by the following:

$$|X/X_w - Y/Y_w| < \Delta t_{xy}$$

and $$|Z/Z_w - Y/Y_w| < \Delta t_{zy}, \text{ wherein}$$

$X_w$, $Y_w$ and $Z_w$ are defined as source illuminant values, and $\Delta t_{xy}$ and $\Delta t_{zy}$ are preselected tolerance values.

A suitable tolerance value is provided due to inherent imprecision and a conversion calculation. This is particularly evident in color space arrays which employ look-up tables and interpolations for values between discrete entries. If a tolerance value is set to zero, neutral gradients in particular will be rendered with somewhat random selection of a four color gray and one color gray, frequently resulting in very poor image quality. Further, computational overhead associated with a determination as to whether a gray value is higher at this stage insofar as normalization of an illuminate is necessary. Gray determination at this stage will affect performance.

The option for determination of gray colors at an output level is described in greater detail. This is suitably accomplished in a device specific description format. In the example relative to PostScript rendering, a determination of a gray color at an output of a color rendering dictionary is very difficult, particularly for those that are downloaded. If a particular dictionary is constructed in such a fashion that it excludes printer linearization and gray balance, for example, the linearization and gray balance being contained in separate calibration data tables, then a gray value is suitably calculated by:

$$|R-G| < \Delta t_{rg},$$

$$|B-G| < \Delta t_{bg}, \text{ and}$$

$$|R-B| < \Delta t_{rb}, \text{ wherein}$$

$\Delta t_{rg}$, $\Delta t_{bg}$, and $\Delta t_{rb}$, are preselected tolerance values.

It is to be appreciated that if a larger tolerance value is desirable as an output of a multi-dimensional look-up table, the look-up table will not have sufficient precision to determine gray colors with a great deal of accuracy. In the event that a color rendering dictionary has been constructed to include necessary linearization and gray balance, that is, constructed from a direct measurement data with linear transfer functions, then gray determination is not suitable at an output of a color rendering dictionary. This is attributed to the fact that equal amounts of toner or ink will not produce a neutral gray and proportions of toner required to yield a gray cannot be predetermined readily for any particular printer.

Figure 4:
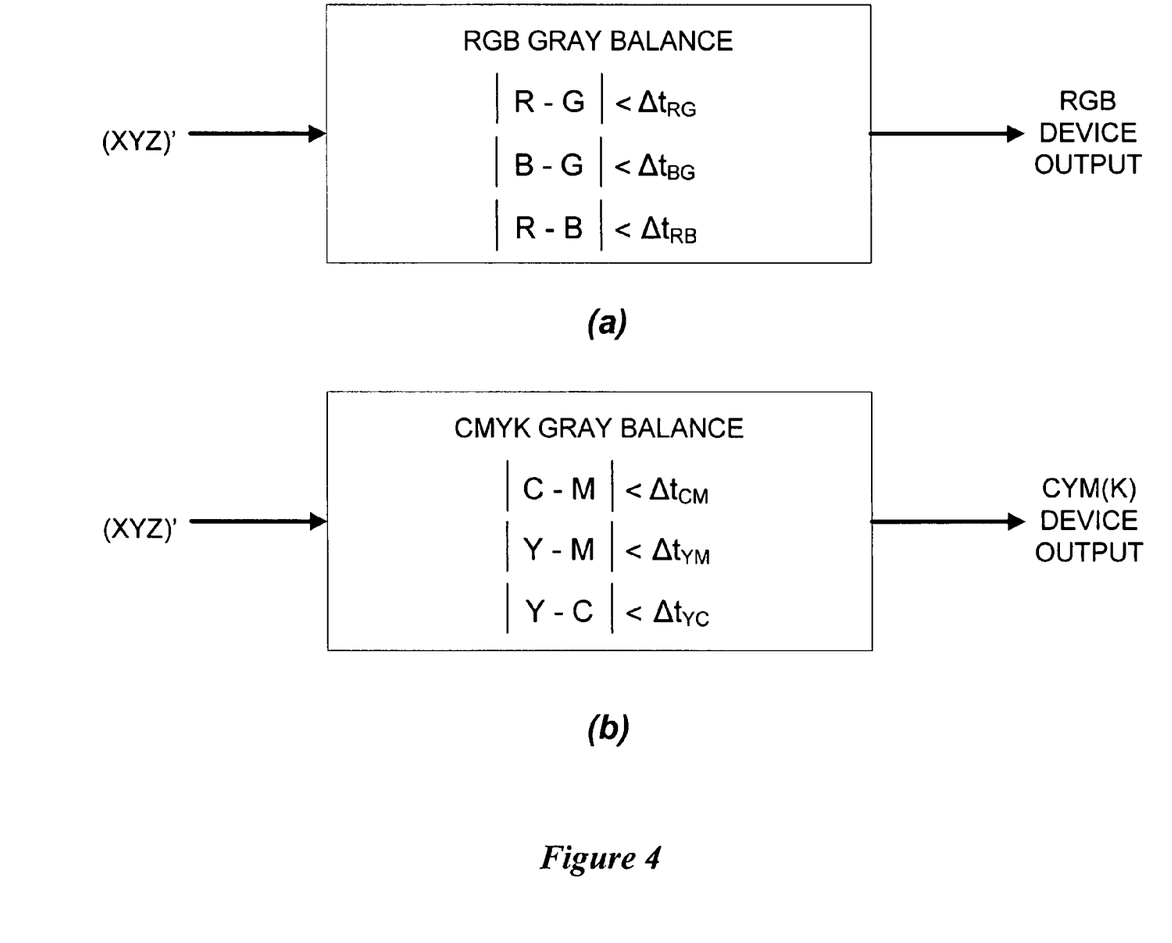
FIG. 4 is a flow diagram of alternative, representative gray balance calibrations illustrated in RGB and CYM(K) space.

FIG. 4 illustrates two alternative gray balance calibration tables that are suitably used in connection with the subject system. FIG. 4(a) illustrates a suitable gray balance for use in connection with an RGB color space. FIG. 4(b) represents a suitable gray balance used in connection with a CYM or CYMK device. The $\Delta t$ values used herein are functions of tri-stimulus value Y of the XYZ input. Therefore, tolerant values are tapered for each conversion in the preferred embodiment.

There are only two considerations for device colors in PostScript, i.e., DeviceRGB and DeviceCMYK, as Device-HSB is a special case of DeviceRGB. Each of these device spaces will be treated separately.

It will be appreciated that Adobe specifications, such as those used in its Portable Document Format ("PDF") include variables inclusive of DeviceRGB and Device CYMK for expressing colorization parameters. For deviceRGB, implementation of gray extraction is straightforward by a determination of whether R=G=B is within a smaller tolerance than is required for CIE colors. For deviceCMYK, the lack of reference as to what printer the CMYK was originally intended for limits any assumptions as to what values of C, M and Y constitute a gray color. Therefore, a known substitution algorithm such as a gray scale extraction disclosed herein algorithm may not be an optimal solution.

The condition that R=G=B is sufficient to determine whether the color is a gray color or not. A small tolerance may still be necessary to allow for precision and calculation issues.

Any input using the RGB device color space makes assumption about the printer, its toners, and its color response. The assumption that C=M=Y represents a gray color is not valid. The determination of a gray will depend upon indeterminate assumptions based upon the printer for which the CMYK values are intended, which may be different from those of the printer doing the rendering. The input of device CMYK values should not have the gray extraction algorithms applied to them.

The nature of the color object that is to be rendered with a gray color will have a major effect upon the use of the gray extraction. Improper use of the algorithms to implement the gray extraction may have a severe impact upon the perceived quality of the rendering of that object. The objects are subtly classified according to text, graphics—stroke, graphics—fill, images, and pattern—gradients.

Integrity of the edges of text is important to readability. The substitution of one color gray for a four color gray is essential to provide better edge integrity for readability. A suitable tolerance is set that is larger than for other object types. The issue of one color gray substitution for four color gray is complicated by considerations for trapping. Strokes that are used to outline graphics that also use fill are better rendered as four color grays to provide some trapping capability to alleviate effect of misregistration. Strokes that are not used to outline filled areas would be better rendered by a one color gray for the same reason as text objects, i.e., better edge integrity. A single policy for gray extraction on graphic—stoke objects may compromise some of the rendering quality.

Large filled areas are not as sensitive to edge integrity considerations and the trapping considerations are more difficult to assess. Gray extraction is generally not recommended.

Images contain a great deal of colors that may grade into one another. Gray extraction should not be applied to such image objects. The replacement of a four color gray with a one color gray will substitute a lighter black for a darker black resulting in undesirable contrast reversals and in some cases even gloss changes.

The specific implementation of gradient generation within PostScript Level 3 patterns may have a major impact on the perceived quality of their rendering if gray extraction is invoked. Most raster image processing implementations will create these gradients by converting several appropriate color values along the gradient from the current color space to the output device space and then generate the other color values needed to complete the gradient by some kind of interpolation. All of the color values needed in a gradient are not color converted with the color management module to improve performance. However, depending upon the nature of the color space used to specify the gradient values, the type and geometry of the gradient, and output device space, an interpolation between discrete color values will introduce errors that make it difficult to determine what colors are "gray."

Some of the neutral color values will be within the PureGray tolerance and some of them will be out of the range of the tolerance. In this case suitable interpolation is performed by the raster image processor to generate the intermediate values for interpolating between a four color gray and single color gray, e.g., intermediate cyan values would interpolate between C and 0, whereas the black value would interpolate between $K_{4color}$ and $K_{1color}$, which will produce a poor gradient.

In addition, if the gradient is to be constructed with two or more opponent colors, which pass through gray for some intermediate value, then the use of the gray extraction taught herein will result in very poor contrast switching in the area of neutral and near-neutral colors. The width of the region that is one color gray will correspond to twice the tolerance of the gray determination algorithm.

For all of the above reasons, the utilization of the subject gray extract algorithm is lessened for pattern-gradients. The major problem is that Pattern—Gradients are generated within the raster image processor and raster image processor would have to disable PureGray for any color management module calls to convert colors.

The use of the subject gray extraction algorithm to substitute a single color gray for a four color gray is subject to variation or modification. There are issues of image quality that are both positive (edge integrity) and negative (loss of trapping benefit) to its use. In addition, a decision as to what values of the color components constitute a gray color, and the performance overhead to make that determination, will differ depending upon the color space that the color components represent.

For CIE color spaces, consistent determination of gray colors is expressed at a stage where the color components are expressed as CIE XYZ, that is, between the color space array and the color converter, which may include a color rendering dictionary as noted above. However, the requirement to normalize the CIE XYZ to the source illuminant requires extra computation overhead and will impact performance. In addition, the color conversion within the color space array will introduce inaccuracies that will require a larger tolerance for the determination of gray colors.

Suitable color space parameters regarding the subject gray extraction is summarized in the following table.

| Input Color Space | Gray Extraction | Use Components |
|---|---|---|
| CIE Based | Yes * | X, Y, Z |
| DeviceRGB | Yes | R, G. B |
| DeviceCMYK | No | — |

Suitable Object Type recommendations are summarized in the following table.

| Object Type | Gray Extraction |
|---|---|
| Text | Yes |
| Graphics - Stroke | Yes * |
| Graphic - Fill | Yes * |
| Images | No |
| Pattern - Gradients | No |

The asterisks ("*") in the above tables refer to these choices having tradeoffs between edge integrity and trapping benefits and represents use of a value that is dependent on each particular situation.

Suitable gray extraction utilization is determined by setting a Boolean in a corresponding Color Management Module ("CMM") Configuration Control Equipment Data Sheet ("CCEDS") that defines a related color transform. The default value is given for the object types as defined in the Policy table with the exception for Pattern—Gradients. Gray extraction utilizing Boolean functions is suitably set in either color management module or in the raster image processor to False for Pattern—Gradients.

It will be appreciated from the forgoing that the subject application teaches a system by which grayscale information is advantageously extracted from a multi-color representation. This affords an image rendering which has increased edge definition, and is more efficiently rendered than systems in which all available colors are utilized for gray color representation.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for producing pure gray tones on a multicolor document output device comprising:
   means adapted for receiving non-linear device independent color data defining an image inclusive of an edge portion and having a plurality of pixels, each pixel having at least three color components, corresponding to an associated electronic document;
   storage means adapted for storing a plurality of preselected tolerance values;
   means adapted for generating difference values associated with a plurality of components associated with each pixel;
   comparison means adapted for comparing each of the difference values to a preselected tolerance value;
   extraction means adapted for extracting gray scale data from the edge portion of the received non-linear device independent color data corresponding to a single color space in accordance with an output of the comparison means;
   output means adapted for outputting modified device independent data including a color data portion and an extracted grayscale data portion; and
   conversion means adapted for converting the modified device independent data to a device specific colors space associated with at least one selected document processing device;

wherein:
   the device independent color data includes coordinate value data representative of X, Y and Z illuminant coordinate values, and
   the conversion means includes means adapted for converting coordinate value data to the modified device in accordance with the equations, $|X/X_w - Y/Y_W| < \Delta t_{xy}$, and $|Z/Z_w - Y/Y_W| < \Delta t_{zy}$, wherein $X_W$, $Y_W$ and $Z_W$ are defined as source illuminant values, and $\Delta t_{xy}$ and $\Delta t_{zy}$ preselected tolerance values.

2. The system for producing pure gray tones on a multicolor document output device of claim 1 wherein the conversion means includes at least one of a color rendering dictionary and a profile connection space.

3. A system for producing pure gray tones on a multicolor document output device comprising:
   means adapted for receiving non-linear device independent color data defining an image inclusive of an edge portion and having a plurality of pixels, each pixel having at least three color components, corresponding to an associated electronic document;
   storage means adapted for storing a plurality of preselected tolerance values;
   means adapted for generating difference values associated with a plurality of components associated with each pixel;
   comparison means adapted for comparing each of the difference values to a preselected tolerance value;
   extraction means adapted for extracting gray scale data from the edge portion of the received non-linear device independent color data corresponding to a single color space in accordance with an output of the comparison means; and
   output means adapted for outputting modified device independent data including a color data portion and an extracted grayscale data portion; and
   conversion means adapted for converting the modified device independent data to a device specific color space associated with at least one selected document processing device,
   wherein the conversion means includes at least one of a color rendering dictionary and a profile connection space, and
   wherein the conversion means includes gray balance calibration means adapted for gray balance calibration of the extracted gray scale data portion.

4. The system for producing pure gray tones on a multicolor document output device of claim 3 wherein:
   the device specific color space includes a red component R, a green component G and a blue component B, and
   the gray balance conversion means includes means for calibrating the extracted gray scale data portion in accordance with the equations, $|R-G| < \Delta t_{rg}$, $|B-G| < \Delta t_{bg}$, and $|R-B| < \Delta t_{rb}$, wherein $\Delta t_{rg}$, $\Delta t_{bg}$ and $\Delta t_{rb}$, are preselected tolerance values.

5. The system for producing pure gray tones on a multicolor document output device of claim 3 wherein:
the device specific color space includes a cyan component C, a yellow component Y and a magenta component M, and
the gray balance conversion means includes means for calibrating the extracted gray scale data portion in accordance with the equations, $|C-M|<\Delta t_{cm}$, $|Y-M|<\Delta t_{ym}$, and $|Y-C|<\Delta t_{yc}$, wherein $\Delta t_{cm}$, $\Delta t_{ym}$ and $\Delta_{yc}$, are preselected tolerance values.

6. A method for producing pure gray tones on a multicolor document output device comprising the steps:
receiving non-linear device independent color data defining an image inclusive of an edge portion and having a plurality of pixels, each pixel having at least three color components, corresponding to an associated electronic document;
storing a plurality of preselected tolerance values;
generating difference values associated with a plurality of components associated with each pixel;
comparing each of the difference values to a preselected tolerance value;
extracting gray scale data from the edge portion of the received non-linear device independent color data corresponding to a single color space in accordance with an output of the comparison; and
outputting modified device independent data including a color data portion and extracted grayscale data portion; and
converting the modified device independent data to a device specific color space associated with at least one selected document processing device,
wherein:
the device independent color data includes coordinate value data representative of X, Y and Z illuminant coordinate values, and
the step of converting further comprises the step of converting the coordinate value data to the modified device in accordance with the equations, $|X/X_w - Y/Y_W|<\Delta t_{xy}$, and $|Z/Z_w - Y/Y_W|<\Delta t_{zy}$, wherein $X_W$, $Y_W$ and $Z_W$ are defined as source illuminant values and $\Delta t_{xy}$ and $\Delta t_{zy}$ are preselected tolerance values.

7. The method for producing pure gray tones on a multicolor document output device of claim 6 wherein the step of converting uses at least one of a color rendering dictionary and a profile connection space.

8. A method for producing pure gray tones on a multicolor document output device comprising the steps:
receiving non-linear device independent color data defining an image inclusive of an edge portion and having a plurality of pixels, each pixel having at least three color components, corresponding to an associated electronic document;
storing a plurality of preselected tolerance values;
generating difference values associated with a plurality of components associated with each pixel;
comparing each of the difference values to a reselected tolerance value;
extracting gray scale data from the edge portion of the received non-linear device independent color data corresponding to a single color space in accordance with an output of the comparison;
outputting modified device independent data including a color data portion and extracted grayscale data portion; and
converting the modified device independent data to a device specific color space associated with at least one selected document processing device,
wherein the step of converting uses at least one of a color rendering dictionary and a profile connection space, and
wherein the step of converting includes the step of calibrating the gray balance of the extracted gray scale data portion.

9. The method for producing pure gray tones on a multicolor document output device of claim 8 wherein:
the device specific color space includes a red component R, a green component G and a blue component B, and
the step of calibrating the gray balance includes the step of calibrating the extracted gray scale data portion in accordance with the equations, $|R-G|<\Delta t_{rg}$, $|B-G|<\Delta t_{bg}$, and $|R-B|<\Delta t_{rb}$, wherein $\Delta t_{rg}$, $\Delta t_{bg}$ and $\Delta t_{rb}$, are preselected tolerance values.

10. The method for producing pure gray tones on a multicolor document output device of claim 8 wherein:
the device specific color space includes a cyan component C, a yellow component Y and a magenta component M, and
the step of calibrating the gray balance includes the step of calibrating the extracted gray scale data portion in accordance with the equations, $|C-M|<\Delta t_{cm}$, $|Y-M|<\Delta t_{ym}$, and $|Y-C|<\Delta t_{yc}$, wherein $\Delta t_{cm}$, $\Delta t_{ym}$ and $\Delta t_{yc}$, are preselected tolerance values.

11. A computer-implemented method operable on an associated processor for producing pure gray tones on a multicolor document output device, the computer-implemented method comprising the steps:
receiving non-linear device independent color data defining an image inclusive of an edge portion and having a plurality of pixels, each pixel having at least three color components, corresponding to an associated electronic document;
storing a plurality of preselected tolerance values;
generating difference values associated with a plurality of components associated with each pixel;
comparing each of the difference values to a preselected tolerance value;
extracting gray scale data from the edge portion from received device independent color data corresponding to a single color space in accordance with an output of the comparison;
outputting modified device independent data including a color data portion and an extracted grayscale data portion; and
converting the modified device independent data to a device specific color space associated with at least one selected document processing device, wherein:
the device independent color data includes coordinate value data representative of X, Y and Z illuminant coordinate values, and the step of converting further comprises the step of converting the coordinate value data to the modified device in accordance with the equations, $$|X/X_w - Y/Y_W| < \Delta t_{xy}$$

and $$|Z/Z_w - Y/Y_W| < \Delta t_{zy}, \text{ wherein}$$

$X_W$, $Y_W$ and $Z_W$ are defined as source illuminant values, and $\Delta t_{xy}$ and $\Delta t_{zy}$ are preselected tolerance values.

12. The computer-implemented method operable on an associated processor for producing pure gray tones on a multicolor document output device of claim 11 wherein the step of converting uses at least one of a color rendering dictionary and a profile connection space.

13. A computer-implemented method operable on an associated processor for producing pure gray tones on a multicolor document output device, the computer-implemented method comprising the steps:

receiving non-linear device independent color data defining an image inclusive of an edge portion and having a plurality of pixels, each pixel having at least three color components, corresponding to an associated electronic document;

storing a plurality of preselected tolerance values;

generating difference values associated with a plurality of components associated with each pixel;

comparing each of the difference values to a reselected tolerance value;

extracting gray scale data from the edge portion from received device independent color data corresponding to a single color space in accordance with an output of the comparison;

outputting modified device independent data including a color data portion and an extracted grayscale data portion; and converting the modified device independent data to a device specific color space associated with at least one selected document processing device, wherein the step of converting uses at least one of a color rendering dictionary and a profile connection space, and wherein the step of converting includes the step of calibrating the gray balance of the extracted gray scale data portion.

14. The computer-implemented method operable on an associated processor for producing pure gray tones on a multicolor document output device of claim 13 wherein:

the device specific color space includes a red component R, a green component G and a blue component B, and the step of calibrating the gray balance includes the step of calibrating the extracted gray scale data portion in accordance with the equations, $$|R-G| < \Delta t_{rg},$$

$$|B-G| < \Delta t_{bg}, \text{ and}$$

$$|R-B| < \Delta t_{rb}, \text{ wherein}$$

$\Delta t_{rg}$, $\Delta t_{bg}$ and $\Delta t_{rb}$, are preselected tolerance values.

15. The computer-implemented method operable on an associated processor for producing pure gray tones on a multicolor document output device of claim 13 wherein:

the device specific color space includes a cyan component C, a yellow component Y and a magenta component M, and the step of calibrating the gray balance includes the step of calibrating the extracted gray scale data portion in accordance with the equations, $$|C-M| < \Delta t_{cm},$$

$$|Y-M| < \Delta t_{ym}, \text{ and}$$

$$|Y-C| < \Delta t_{yc}, \text{ wherein}$$

$\Delta t_{cm}$, $\Delta t_{ym}$ and $\Delta t_{yc}$, are preselected tolerance values.

* * * * *

UNITED STATES PATENT AND TRADEMARK OFFICE
CERTIFICATE OF CORRECTION

| | | |
|---|---|---|
| PATENT NO. | : 7,679,783 B2 | Page 1 of 1 |
| APPLICATION NO. | : 11/371830 | |
| DATED | : March 16, 2010 | |
| INVENTOR(S) | : Pellar | |

It is certified that error appears in the above-identified patent and that said Letters Patent is hereby corrected as shown below:

In claim 1, Column 10, starting at line 1, please replace the claim as follows:

--conversion means adapted for converting the modified device independent data to a device specific color space associated with at least one selected document processing device;--

In claim 13, Column 13, starting at line 32, please replace the claim as follows:

--comparing each of the difference values to a preselected tolerance value;--

Signed and Sealed this
Twenty-eighth Day of December, 2010

David J. Kappos
*Director of the United States Patent and Trademark Office*